Jan. 2, 1962 W. B. FAHRENBACH ET AL 3,015,256
MACHINE FOR FORMING CARTONS
Filed July 27, 1959 7 Sheets-Sheet 1

INVENTORS
WOLFGANG B. FAHRENBACH
and FRED E. HELMICK
BY Fehr & Swain
ATTORNEYS

Jan. 2, 1962 W. B. FAHRENBACH ET AL 3,015,256
MACHINE FOR FORMING CARTONS
Filed July 27, 1959 7 Sheets-Sheet 3

INVENTORS
WOLFGANG B. FAHRENBACH
and FRED E. HELMICK
BY Flehr & Swain
ATTORNEYS

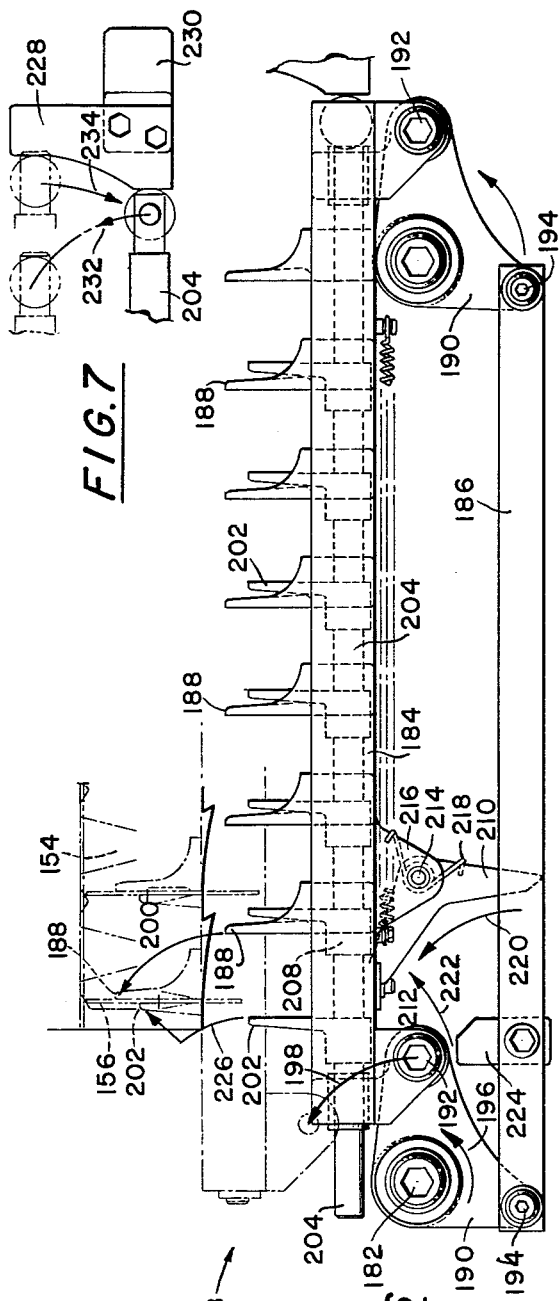
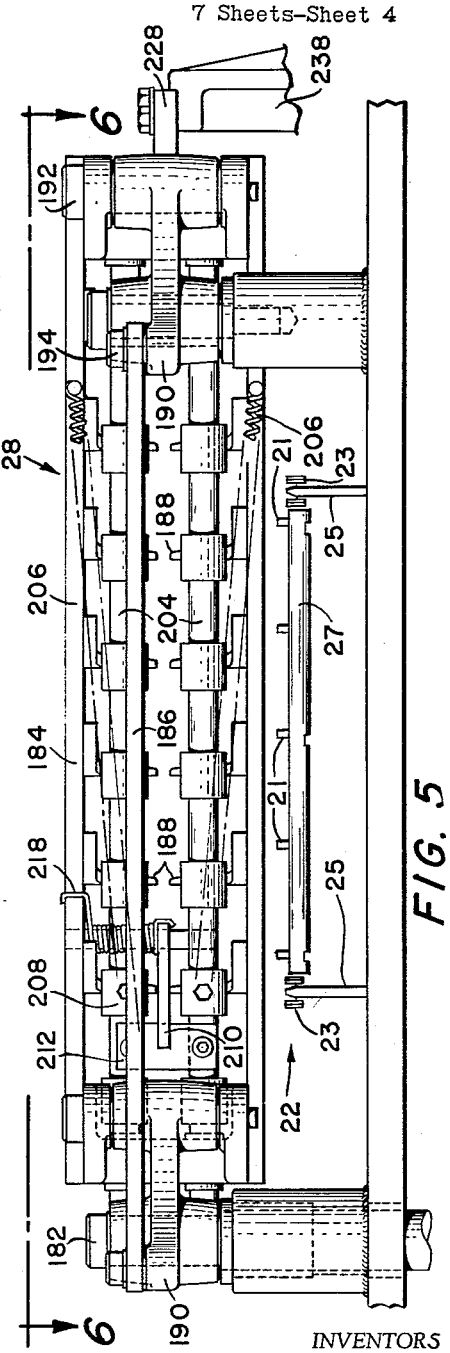

Jan. 2, 1962  W. B. FAHRENBACH ET AL  3,015,256
MACHINE FOR FORMING CARTONS
Filed July 27, 1959  7 Sheets-Sheet 5
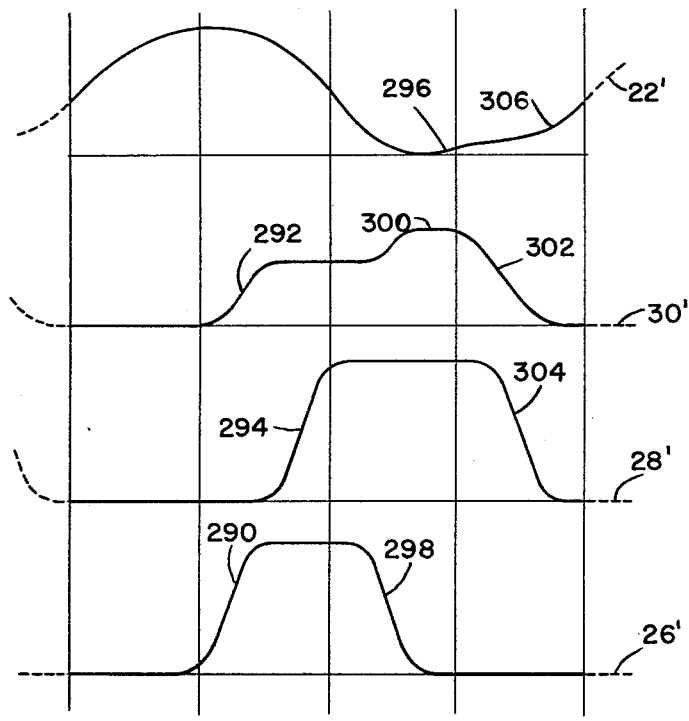
FIG. 8
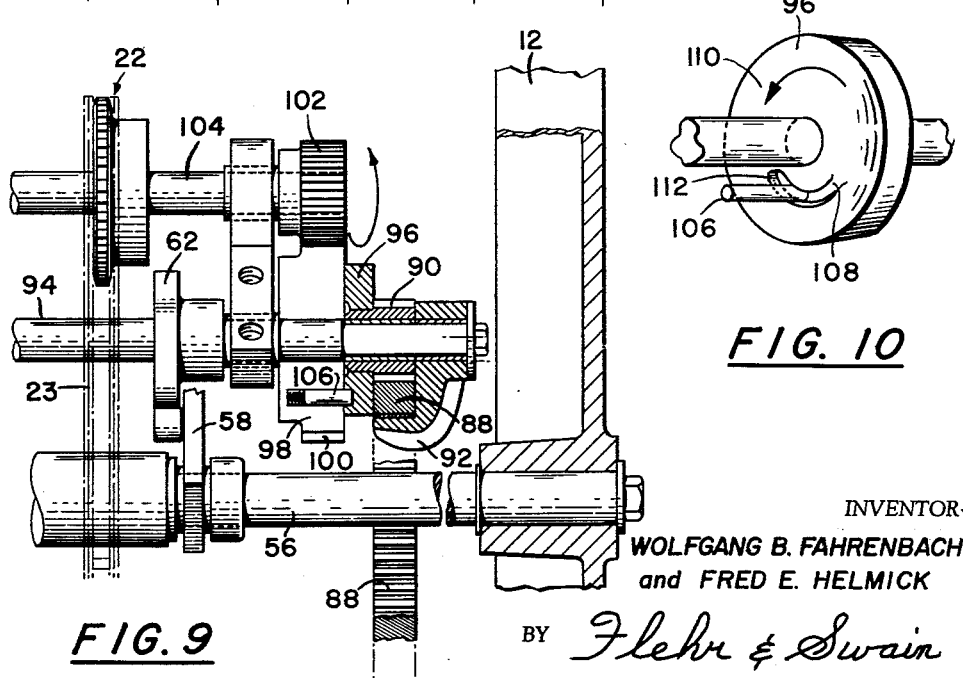
FIG. 9
FIG. 10
INVENTORS
WOLFGANG B. FAHRENBACH
and FRED E. HELMICK
BY Flehr & Swain
ATTORNEYS INVENTORS
WOLFGANG B. FAHRENBACH
and FRED E. HELMICK BY Flehr & Swain

ATTORNEYS

United States Patent Office 3,015,256
Patented Jan. 2, 1962

3,015,256
MACHINE FOR FORMING CARTONS
Wolfgang B. Fahrenbach, Oakland, Calif., and Fred E. Helmick, Alameda, Calif. (381 Felton Drive, Menlo Park, Calif.); said Fahrenbach assignor to said Helmick
Filed July 27, 1959, Ser. No. 829,661
8 Claims. (Cl. 93—37)

This invention relates to carton forming machines, and is concerned more particularly with the provision of a machine of this character adapted to forming egg cartons of the type shown in copending Randles application Serial No. 659,044, now Patent No. 2,946,497, filed May 14, 1957.

Numerous high speed automatic machines for forming partitioned egg cartons have been developed and many are highly effective, for example, the machine described in copending Randles application Serial No. 729,448, now Patent No. 2,935,917, filed April 18, 1958. However, machines of this type are generally subject to the difficulty that the carton blanks are gravity fed and pushed endwise into the machine. As a result the blanks frequently fail to feed in proper sequence so that the machine jams or chokes, necessitating constant attention, or ceases to function altogether. In addition the formed cartons are frequently discharged in similar unsatisfactory fashion or are delivered to a relatively inaccessible position such as beneath the machine, so that the usefulness of the machine is impaired.

In general it is an object of the present invention to improve upon carton forming machines of the above character, particularly with respect to means permitting carton blanks and formed cartons to be positively pulled through the machine rather than to be pushed, or to be propelled by the force of gravity.

Another object of the invention is to provide a carton forming machine of the above character employing improved means for forming the carton partitions.

A further object of the invention is to provide such a machine which is fully automatic in operation.

Another object of the invention is to provide a carton forming machine of the above character which operates in cyclic fashion to pull a carton blank through the machine in successive operating steps so that the carton blank is formed, the partitions bent and positively held in position, a bottom panel folded and interlocked with said partition to form the completed carton, and the carton pulled from the machine to a desired point of discharge.

Other objects and advantages of the invention will be apparent from the following description of a preferred embodiment thereof, as illustrated in the accompanying drawings in which:

FIGURE 5 is a sectional view along the line 5—5 of FIGURE 4.

FIGURE 6 is a view from the top along the line 6—6 of FIGURE 5.

FIGURE 7 is a fragmentary view of portions of the structure shown in FIGURE 6, with overlying structure removed for the sake of clarity.

FIGURE 8 is a schematic view of the various cam means by which conveyance of the blanks and the forming, folding and interlocking of the cartons are accomplished in timed sequence.

FIGURE 9 is a detail view along the bent line 9—9 of FIGURE 1, illustrating details of the feed conveyer.

FIGURE 10 is a representational view showing a detail of the feed conveyor drive mechanism.

Figure 1:
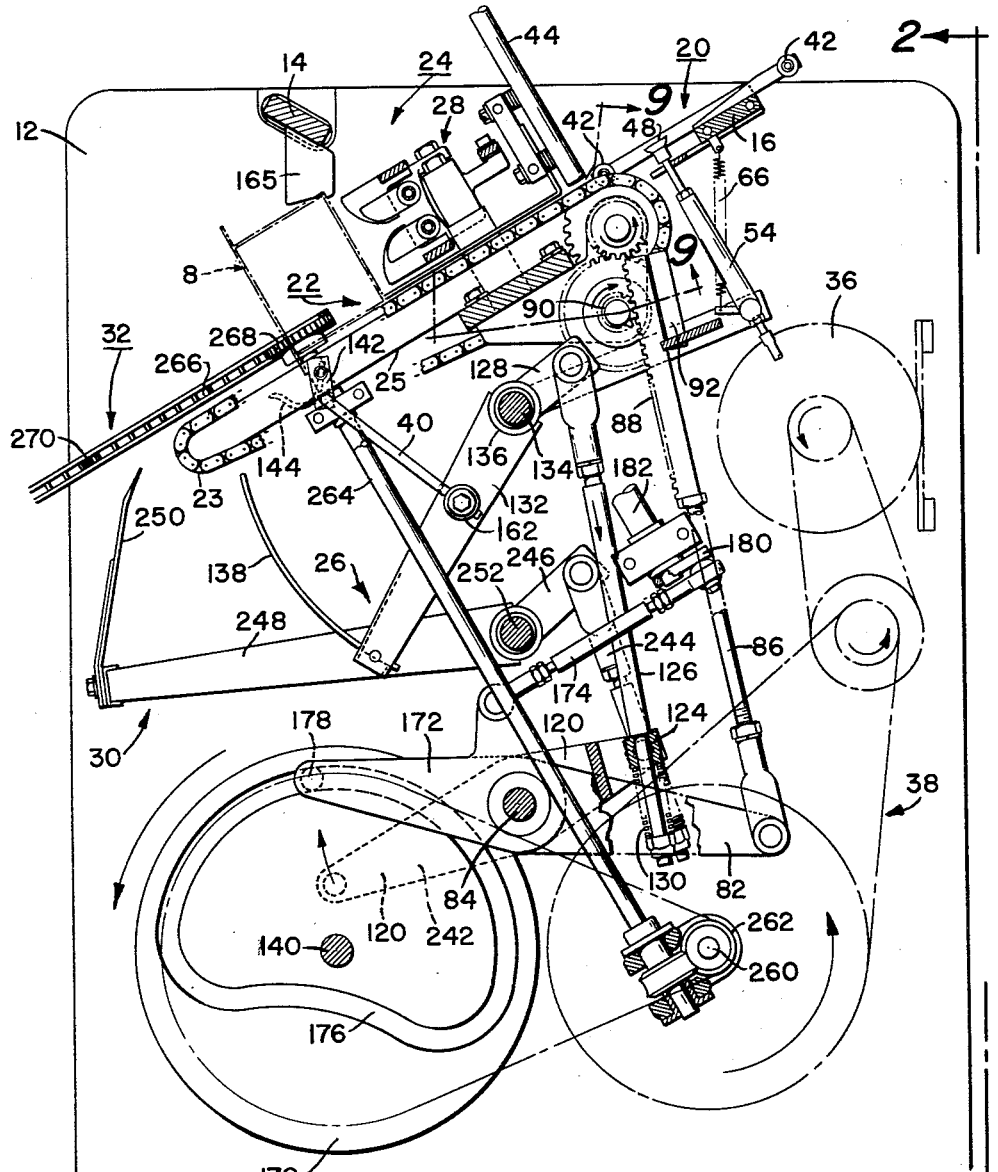
FIGURE 1 is a view in section and in elevation of the machine, taken from the left hand side thereof.

In general, the carton forming machine of the instant invention operates in conjunction with a prefabricated carton blank having certain portions thereof die cut and folded and glued to other portions thereof to form a blank suitably adapted to the operations of the machine. The machine performs the function of forming the carton blank to the desired shape, bending or folding a plurality of transverse partitions in the formed blank, and then folding and tucking the bottom portions of the blank into engagement with the transverse partitions to interlock the same into a formed, completed carton. The preferred embodiment illustrated comprises a frame including respective side plates 10 and 12 (FIGURES 1 and 2) which are connected adjacent the top by angled transverse frame brackets 14 and 16, and adjacent the bottom by a base plate 18. The various brackets and base plate are bolted to the side plates 10 and 12. The frame provides a mounting for means forming various operating stations in the machine, including a feeding station 20 (FIGURES 1 to 3), an endless feed conveyer 22, a folding station 24 (FIGURES 1 and 4) including operatively associated forming, partition folding and panel interlocking sub-assemblies 26, 28 and 30 (FIGURE 1), and an endless discharge conveyer 32 leading to a discharge station. As will be described, the machine functions to feed a carton blank from the feeding station 20 to the folding station 24 where it is engaged by the forming, folding and interlocking sub-assemblies in predetermined sequence, and thereafter to discharge the formed carton to the discharge station.

The drive mechanism of the machine includes a suitable source of power such as an electric motor 36 (FIGURE 1) which acts in a counterclockwise direction through the power transmitting train 38 to similarly rotate a cam shaft 40 suitably mounted in bearings in the side plates 10 and 12. It will be understood that the relative sizes of the various pulleys, wheels and sprockets comprising the train 38 are selected in accordance with well known principles to effect the desired ratio between the motor speed and the cam shaft. The cam shaft 40 in turn has various cams of the machine rotatable therewith in a manner later described.

Blank feeding station

Figure 3:
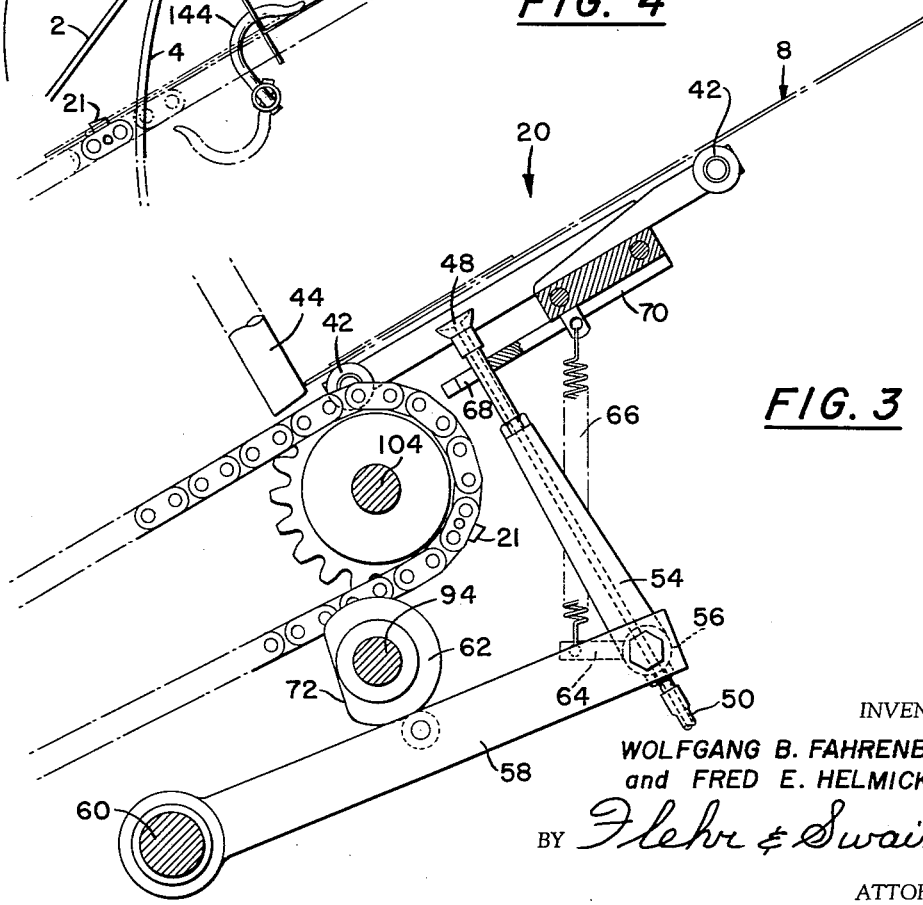
FIGURE 3 is an enlarged fragmentary view, similar to FIGURE 1, showing the details of the feed mechanism.

The blank feeding station 20 (FIGURES 1 and 3) functions to receive a stack of the carton blanks 8 (FIGURES 11 to 13) and to pull the lowermost blank in the stack downward so as to be positively engaged for movement into the machine by the endless feed conveyer 22. As best seen in FIGURES 1 and 3, the station 20 includes a plurality of rollers 42 adapted to provide edge support to the stack of blanks and upstanding guides 44 adapted to be received within the slots 46 provided in the leading edge of the carton blanks. Together the rollers and guides form a hopper structure adapted to hold and store a plurality of the carton blanks for feeding one at a time into the machine.

Figure 2:
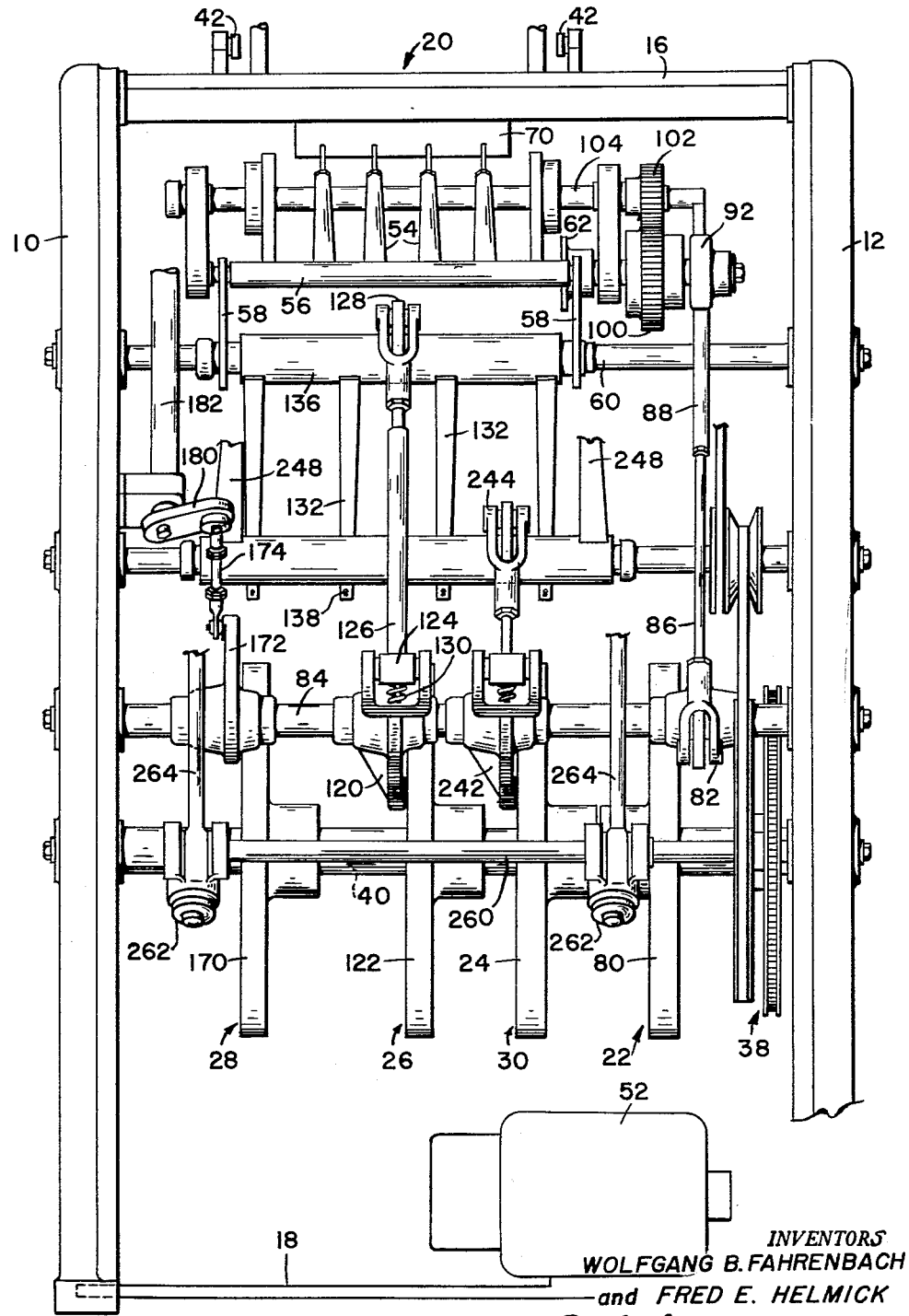
FIGURE 2 is an elevational view from the feed side of the machine taken along the line 2—2 of FIGURE 1.

A plurality of suction cups 48 are positioned below the zone of the hopper and exert continuous suction by means of the vacuum line 50, operated by a suitable vacuum pump such as the pump 52 (FIGURE 2). The suction cups 48 are rigidly supported by the arms 54 of the cross head 56 which in turn is mounted for pivotal movements adjacent the ends of the rocker arms 58. The latter are supported on the cross shaft 60 for rocking movements in response to rotation of the cam 62, which engages a roller 63 carried by one of the arms 58. As will appear, the cam 62 is adapted to be driven intermittently with the endless feed conveyer 22. The head 56 and arms 54 are normally biased in a clockwise direction as viewed in FIGURE 3 by means of the crank 64 and spring 66 so as to position the suction cups within the slots 68 of the guide plate 70. It will be understood however that the arms 54 and suction cups are free to pivot in the direction of feed (to the left) to accommodate movement of the lowermost blank in the stack into the machine.

As mentioned before, the feeding of a carton blank 8 into the machine depends upon the application of suction forces to the lowermost blank in the hopper to pull it downwardly to a position of engagement with the advancing projections or cleats 21 (FIGURE 5) of the endless feed conveyer 22. In the position of FIGURE 3, no feeding will occur because the lowermost carton blank (represented by the dotted lines) is held in spaced relation with respect to the suction cups and the feed conveyer. However, rotation of the cam 62 to bring the flattened side 72 into engagement with the roller 63 will effect upward movement of the suction cups in response to the spring 66, and consequent engagement of the suction cups 48 with the lower side of the blank (at the points 74 illustrated in FIGURE 11). Continued rotation of the cam 62 will again cause the rocker arms 58 to be depressed, pulling central portions of the blank downward to a position of engagement with the projections 21 of the feed conveyer. The latter engage the openings 76 of the blank and effect a positive feeding movement of the blank into the machine. During the feeding, the blank continues to be supported at its edges by the rollers 42 and eventually slides off the suction cups 48. The latter being in a down position are ineffective to engage a blank until again raised by the cooperative movement of the cam 62 and rocker arms 58.

*Feed conveyor*

The endless feed conveyer 22 (FIGURES 1 to 3) functions to pull a carton blank received from the feeding station 20 in a continuous positive movement until the blank has reached a desired position in the folding station 24. Essentially the feed conveyer consists of a pair of endless chains 23 which are supported in their upper reach by the guide bars 25. At predetermined positions along their length, the chains support cross supports 27 for the plurality of blank advancing cleats or projections 21 (FIGURE 5). As will appear the chains are adapted to intermittent movement, and the projections 21 are positioned to engage a blank during the period of movement to perform the desired feeding function.

As illustrated in FIGURES 1 and 2, the endless chains 23 are driven in cyclic fashion by means of the cam 80 carried by the rotating shaft 40, which functions to rock the arm 82 mounted on the cross shaft 84. A link 86 carried by the outer free end of the rocker arm is provided at its upper end with a rack 88 which is held in engagement with the pinion 90 by means of the guide 92.

As illustrated in FIGURE 9, the pinion 90 is keyed to a stubshaft 94, and carries a clutch element 96. An opposing clutch element 98 is rotatably mounted on the shaft 94 and is provided with gear teeth 100 about its periphery adapted to mesh with the gear 102. The latter provides driving impetus to the feed conveyer 22 through the shaft 104.

The clutch mechanism functions to permit downward movement of the rack 88 to drive the chains 23 of the feed conveyer in a cyclic feeding movement (to the left in FIGURES 1 and 3), while permitting slippage as the rack moves upward during the folding operations at station 24. As will be apparent from the schematic representation of FIGURE 10, the described operation of the clutch results from the engagement of the spring biased pin 106 carried by the clutch element 98 in the tapered groove 108 provided in the clutch element 96. Rotation of the clutch element 96 in the direction of the arrow 110 causes the pin 106 to be engaged by the end wall 112 of the tapered groove, and to be carried therewith to drive the feed conveyer in a forward direction. Upon reverse rotation of the element 96, the pin 106 will ride through the groove 108 and permit a rest period of the feed conveyer. The net effect is a cyclic, unidirectional movement of the feed conveyer.

It will be noted that the cam 62 controlling operation of the suction cups 48 is likewise carried by the stubshaft 94. This insures that the suction cups will function in proper timed relation to the advance of the feed conveyer, in removing a carton blank from the hopper.

*The folding station*

The folding station 24 (FIGURES 1 and 3) functions to receive the carton blanks one after another from the feeding station 20, and to subject them to the various forming, folding and tucking operations necessary to form the completed carton. These various operations are performed by a number of subassemblies which are associated with the folding station. Specifically the forming subassembly 26 functions to grasp a lower portion of the blank and thereafter to fold upper portions to achieve the desired hollow-box carton form. The partition folding subassembly 28 functions to bend a plurality of upthrust partitions in the upper blank portion into a transverse attitude and to rigidly grasp and position the partitions prior to operation of the interlocking subassembly 30. The latter subassembly functions to fold and tuck upthrust lower portions of the blank into interlocking engagement with the plurality of partitions to form the completed carton.

Figure 11:
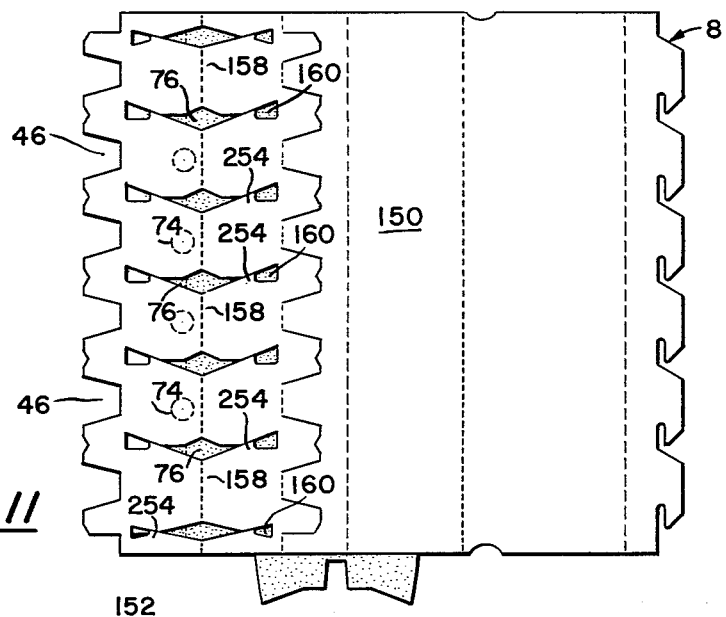
FIGURE 11 illustrates a carton blank in accordance with the invention.
Figure 12:
FIGURE 12 is an end elevation thereof.
Figure 13:
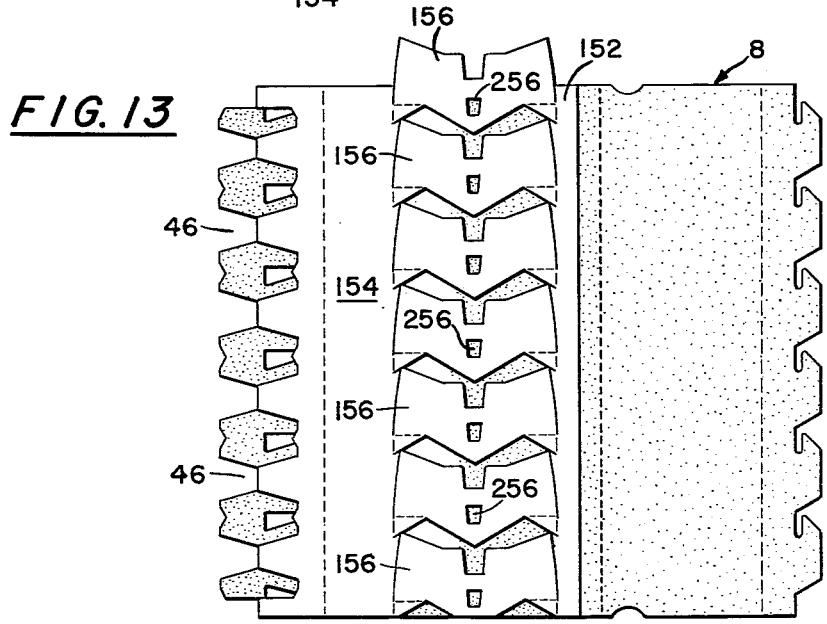
FIGURE 13 is a view from the opposite side thereof.
Figure 15:
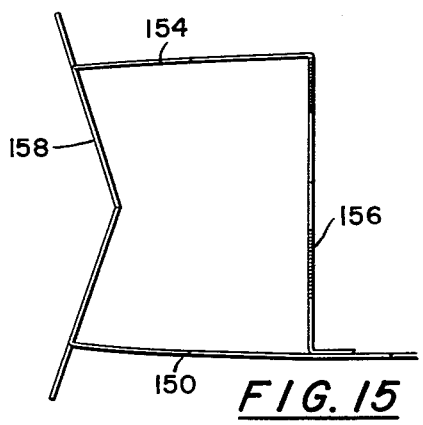
FIGURES 15 to 17 are views in end elevation, showing the sequence of steps involved in folding the component parts of a formed carton into interlocking engagement to form a completed carton.
Figure 16:
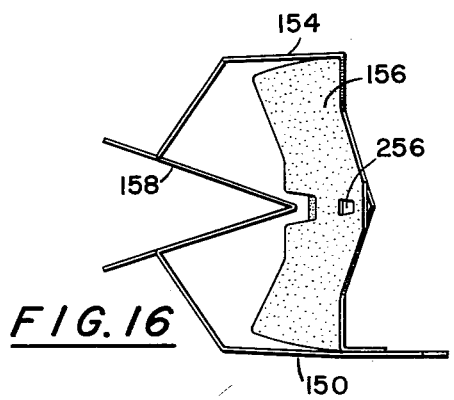
Figure 17:
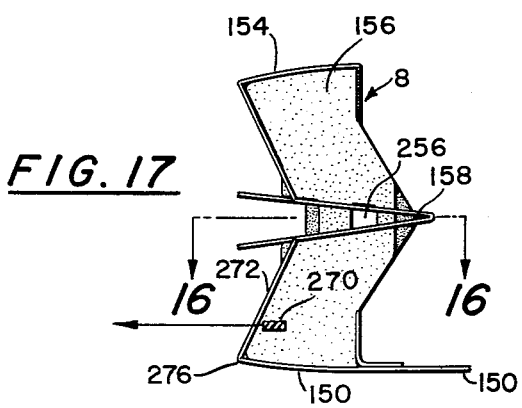

Referring to FIGURES 11 to 13, it will be seen that a carton blank includes a lower portion or face 150 which is die cut in predetermined manner, and to which is secured along a gluing strip 152, extending transversely of the panel, an upper folded portion or panel 154. The upper panel 154 is similarly die cut to provide a plurality of partitions 156 which are adapted to be bent into a transverse attitude, for example as in FIGURE 15. The lower panel 150 is provided with a plurality of foldable panel portions 158 which when folded and tucked into engagement with the transverse partitions interlock the same into a formed, completed carton, as generally illustrated in FIGURES 15 to 17.

*Blank forming subassembly.*—The blank forming subassembly 26 (FIGURES 1 and 2) operates in response to movement of the rocker arm 120, caused by rotation of the cam 122. The distal end of the rocker arm is bifurcated to rotatably receive the slide mount 124 for the lower end of the link 126. The latter is resiliently held in proper position with respect to the crank 128 to which it is pivotally attached by means of the spring 130. The crank 128 is effective to pivotally operate the kicking legs 132 pivotally supported on the cross shaft 60 by means of the sleeve 136. The legs 132 in turn carry the kicker feet or forming fingers 138 which are swingable from a normal position as shown in FIGURE 1 to the forming position shown in FIGURE 4. The legs 132 carry frictionally engaged pusher rods 140 (FIGURE 1) which pivotally engage cranks 142 for clamping hooks 144. The latter are mounted for pivotal movements with respect to the guide frames 25 supporting the feed conveyer 22.

Figure 14:
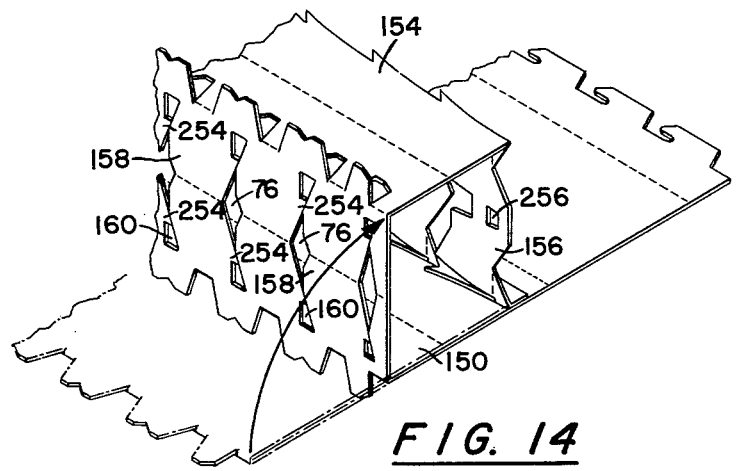
FIGURE 14 is a perspective view of a portion of a carton blank, illustrating the forming and partition folding operations.

FIGURE 14 illustrates the effect of the forming fingers 138 in thrusting the upper portion 154 of the carton blank upward and away from the lower portion 150 to achieve the hollow-box carton form illustrated. However, prior to this forming operation of the fingers 138, it is necessary that the lower portion 150 be held or clamped against the conveyor, otherwise the "suction" or attraction between the surfaces of the panels may be sufficient to overcome the rigidity of the lower panel and cause both to bend upwardly, with consequent jamming. This clamping function is provided by the hooks 144 which are pivoted upwardly and through the die cut openings 169 provided adjacent the fold line of the panel portions 158 (FIGURE 14). This pivotal movement of the hooks 144 is accomplished prior to operative engagement of the forming fingers by the action of the push rod 140. After clamping of the hooks 144, excess travel of the pusher rods 142 relative to the kicker legs 132 is accommodated by slippage of the former against friction pads provided at their points of pivotal attachment to the legs.

Figure 4:
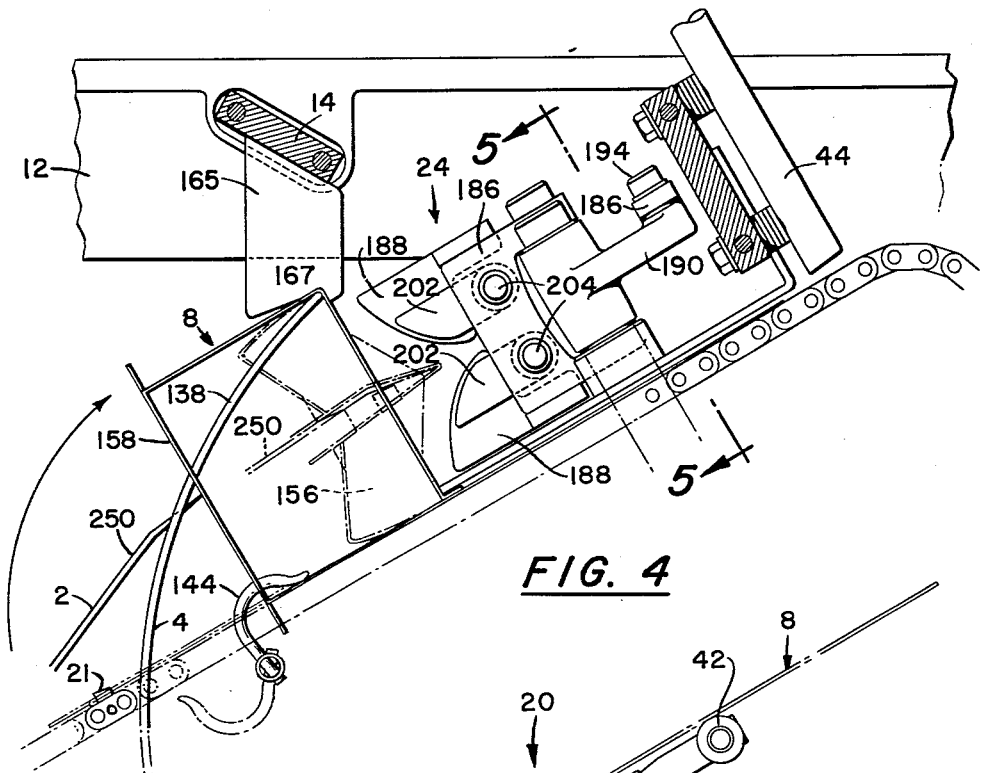
FIGURE 4 is a like view illustrating the portion of the machine in which the cartons are folded and formed.

In the actual carton forming operation, the fingers 138 pass through the die cut openings 76 of the lower panel 150 and lift the panel free of the projections 21 of the feed conveyer. Thereafter the blank is held only by the hooks 144. This relationship is shown in FIGURE 4.

In the sequence of the machine, it is desirable that the forming fingers 138 be withdrawn prior to the partition folding and interlocking operation. However, the natural resiliency of the material of the carton tends to return it to its original unfolded position. In the illustrated apparatus, this is avoided by the provision of a plurality of notched plates 165 which are supported in depending relation from the cross frame 14. As clearly illustrated, in FIGURE 4, the fingers 138 tend to force the upper corners of the formed carton into the notched openings 167 so that the carton is thereafter held in the full box-like section.

*The partition folding subassembly.*—The partition folding subassembly (FIGURES 4 to 7) is operated by the cam 170 through the bent rocker arm 172 and link 174. The cam 170 illustrated in FIGURE 1 is typical of the cams employed in the illustrated apparatus, and makes use of a cammed groove 176 adapted to receive the cam follower 178. As will be apparent from FIGURES 1 and 2, the rocking movement of the arm 172 functions through the link 174 to impart a to and fro movement to the crank 180 and its associated vertically extended shaft 182.

At its upper end, the shaft 182 functions to impart to and fro movement to the sides of a parallelogram linkage on which are supported the plates and associated mechanisms by which the partitions are bent into a transverse attitude. This relationship is particularly illustrated in FIGURES 5 and 6 where the parallelogram linkage is seen to consist of a main plate supporting frame 184 and a rear guide bar 186. The frame 184 is substantially rectangular in vertical configuration and rigidly supports upper and lower partition engaging plates 188. The linkage is completed by the pivot brackets 190 which support pivots 192 and 194 for the frame 184 and guide bar 186, respectively. As will be apparent from FIGURE 6, rotation of the shaft 182 in the direction of the arrow 196, will swing the frame 184 forward and to the left as indicated by the arrow 198. This effects a similar movement of the partition forming plates 188 along the arrow 200 to engage and bend the partitions 156 of a carton in the manner illustrated in sequence in FIGURES 15 to 17.

In addition to the bending plates 188, additional plates 202 are provided to grasp the partitions 156 and to hold them rigid during the interlocking with the panel portions 158. This function is made possible by transverse rods 204 mounted for sliding movement with respect to the frame 184, and which provide a means of sliding support for the plates 202. The rods 204 are urged to the right as viewed in FIGURES 5 and 6 by the springs 206 which are attached at one end to the rods by the adjustable mounts 208 and at the other end to the frame 184. However, the rods are normally held in a left hand or cocked position by means of a latch 210 which engages a stop 212 rigidly secured in linking position between the rods. The latch is supported for pivotal movements on the pin 214 which is carried by the protruding brackets 216 and is normally biased into engagement with the stop 212 by the torsion spring 218.

Referring specifically to FIGURE 6, it may be seen that as the plates 188 move forward to bend the partitions, the latch 210 moves forward along a similar arc as indicated by the arrow 220. At the same time the guide bar 186 moves forward along the arc 222. This relative movement makes it possible to suitably position a trip 224 so that it will engage the extending end of the latch 210 to release the plates 202 at a desired moment in the partition folding operation. This movement is represented by the bent arrow 226 which shows the initial movement of the plates 202 with the plates 188, and the subsequent sidewise movement away from such plates to grasp the partitions 156 against the next adjacent pair of plates 188. This final position of the plates is illustrated in dotted lines at the top of FIGURE 6.

FIGURE 7 illustrates the means for returning the rods to their original cocked position, in response to a reverse movement of the shaft 182. The cam 228 is secured in spaced relation to the right hand ends of the rods 204 by means of a bracket 230 mounted on the side frame 12. In FIGURE 7, the arrow 232 represents the movement of the rods 204 during the forward movement of the shaft 182, and prior to their release, whereas the arrow 234 represents the movement of the rods during a return movement of the shaft 182. The cam 228 functions during the latter movement to return the stop 212 to a cocked position in relation to the latch 210.

*The interlocking subassembly.*—The panel interlocking subassembly 30 (FIGURES 1, 2 and 4) functions to drive the foldable panels 158 of the carton blank between and into interlocking engagement with the transversely positioned partitions 156. This subassembly is operated by the cam 240 through the rocker arm 242, which is similar in construction to the arm 120. Movement of the rocker arm is transmitted to the legs 248 through the link 244 and crank 246 with the result that the sharpened drivers or toe members 250 are pivoted upwardly about the cross shaft 252.

Figure 18:
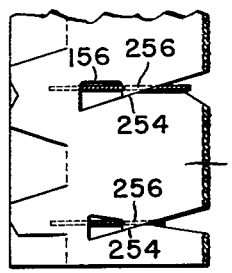
FIGURE 18 is a sectional view along the line 16—16 of FIGURE 17.

FIGURE 4 illustrates the instant of engagement of the drivers with the foldable panels to achieve a partial bending of these panels, as illustrated in FIGURE 15. Upon transverse positioning of the partitions 158 the drivers are thrust to the dotted position of FIGURE 4 to tuck and interlock the foldable panels 158 between the partitions, as illustrated in FIGURES 17 and 18. Specifically the die cut corners 254 of the panels are thrust into a position where they engage and protrude into the openings 256 provided in the partitions. It will be noted that the partition forming plates 188, 202 provide a central V-shaped opening somewhat wider than the driving members 250 so as to facilitate the tucking and interlocking operation.

The carton now is in the completed form illustrated in FIGURE 17 and upon removal of the driver and forming fingers 250 and 138 is ready for discharge from the machine.

*Cam sequence*

The sequence of operation of the machine is determined by the various cams carried by the cam shaft 40. FIGURE 8 graphically illustrates the function of these cams, and is a plot of the vertical movement of the cam followers associated with the feed conveyer and the various subassemblies of the folding station against time. For convenience, the various curves are identified by the primed reference numerals of the particular mechanism involved. Thus curve 22' represents the movement of the cam follower associated with the feed conveyer, curve 26' the movement of the cam follower for the carton forming subassembly, and 28' and 30' the movement of the followers for the partition folding and interlock subassemblies. To further facilitate understanding, the time cycle of the machine is broken into four equal stages, designated I, II, III and IV in FIGURE 4.

Referring to the drawing, it will be seen that in stage I of the machine cycle, the cam follower for the feed conveyer is moved up causing the rack 88 to be moved down. The result is to drive the feed conveyer 22 forward to advance a carton blank into the folding station. In stage II, the follower for the feed conveyer moves down but effects no further movement of the conveyer due to the slippage provided by the clutch mechanism 96, 98. However, during this stage, the forming fingers 138 are moved in position to form the carton, as represented by the portion 290 of the curve 26'. The driver elements 250 are simultaneously moved to achieve the partial bending of the carton flaps 158 (FIGURE 15) as represented by the portion 292 of the curve 30'. Near the end of stage II, the partition forming plates 188, 202 are energized by rotation of the shaft 182 (arrow 196 in FIGURE 6), as indicated by the portion 294 of the curve 28'.

In stage III, the feed conveyer approaches the end of its rest period, corresponding with upward movement of the rack 88, with conveyer movement being again initiated at the point 296 of the curve near the end of this stage. However, while the formed carton is still at rest, the forming fingers 138 are withdrawn (portion 298 of curve 26') and the driver elements 250 thrust into the dotted line position of FIGURE 4 to perform the interlock function (portion 300 of curve 30').

In stage IV of the cycle of operations, the driver elements are withdrawn (portion 302 of curve 30') simultaneously with return of the partition forming plates 188, 202 to their original position (portion 304 of curve 28'). During these operations, the feed conveyer gradually moves forward to reposition the previously idle projections 21 for the next cycle of operation (portion 306 of curve 22'). The machine is now in position for the feeding, forming and interlocking of a carton in the next cycle of operation.

Discharge conveyer

As has previously been explained, each carton blank 8 is positively pulled into the folding station by the feed conveyer and is thereafter released from the feed conveyer by the operation of the forming fingers 138 during the carton forming operation. The formed carton is therefore disengaged from the feed conveyer and free to be moved away from the folding station by the endless discharge conveyer 32.

As illustrated in FIGURE 1, the discharge conveyer comprises two endless chains 266, each reeved about the sprockets 268 in such fashion as to pass closely adjacent the ends of a completed carton positioned in the folding station 24. The chains 266 are continuously operated by means of the shaft 260, power takeoffs 262, and conveyer drive shafts 264 (FIGURES 1 and 2). As illustrated, there are two drive shafts 264, one for each of the chains 266 of the discharge conveyer.

Discharge of a carton is effected by projections 270 mounted on the endless chains so as to protrude inwardly into engagement with folded end portions of the cartons. Specifically these projections are adapted to engage the end tabs 272 illustrated in FIGURE 17, and upon subsequent movement of the chains 266 serve to positively pull the carton from the folding station 24 to a discharge station (not shown) adjacent the end of the discharge conveyer. During the discharge operation, the carton is slid outwardly from the folding station along the lower panel 150 until it clears the discharge end of the feed conveyer. Thereafter the weight of this panel causes the carton to swing about the projection 272 until the carton hangs in suspended position from the corner folds 276. Experience has shown that the top flap of panel 150 is equivalent in weight to the body portion of the carton so that balance is achieved. The cartons are therefore positively removed from the machine one by one, and are transported in suspended relation to the discharge station for subsequent operations.

Machine operation

Reviewing briefly the machine operation, it is assumed that the parts are in the positions illustrated in FIGURE 1. The rack 88 has just completed a downstroke causing the feed conveyer 22 to advance a carton blank from the feed station 20 to the folding station 24. In other words, stage I of the cam sequence has just been completed. In the succeeding sequence of stage II, the rack 88 will move through an upstroke which corresponds to a rest position of the feed conveyer. At the same time the kicker legs 132 of the forming subassembly are pivoted upwardly causing the push rods 140 to swing the clamping hooks 144 from the dotted position of FIGURE 1 to the full line position of FIGURE 4. Further pivoting of the kicker legs causes the forming fingers 138 to engage and thrust upper portions of the blank into the folded, hollow-box carton form shown in FIGURE 4. Simultaneously, the interlocking subassembly is energized to rotate the drivers 250 into their initial position and corresponding to the partially folded position of the panels 158 illustrated in FIGURE 15. Shortly thereafter the partition folding subassembly is energized to swing the parallelogram linkage 184, 186 into the forward position. This causes the plates 188 to engage the partition panels 156 to bend them forward, and subsequently causes the rods 204 and plates 202 to be released to grasp the partitions and to firmly hold them in position for the interlock operation. The machine now enter stage III of its cycle of operation, during which the drivers are pivoted to the full extent of the interlock stroke, causing the flaps 158 to interlock with the partitions 156 in the manner illustrated in FIGURES 16 and 17. Thereafter, the various subassemblies of the folding station are returned to their original positions, completing the carton forming and interlocking operation. The formed carton is now discharged by engagement of the inwardly directed projections 270 of the discharge conveyer with the end walls of the carton. It will be noted that no camming function is required to effect such engagement, or discharge of the cartons. By a proper selection of the length of the endless conveyer chains 266, and of the positions of the projections 270, it is possible to insure that the projections will be moved past the completed cartons at the desired instant in the cycle of operation.

During the period of discharge of a carton, the feed conveyer 22 operates to advance an idle set of the projections 21 to approximately the position illustrated in FIGURE 3. This advance is achieved during the initial downstroke of the rack 88. As the feed conveyer continues to advance, the cam 62 is rotated to cause the suction cups 48 to move upward into engagement with the lowermost blank stacked in the feed station, and thereafter, to pull the blank downward into a position of engagement with the advancing projections 21. The projections 21 enter the openings 76 of the blank and positively pull the same into the folding station 24 for the various operations performed at such station.

From the foregoing, it will be apparent that the feeding of the carton blanks and the discharge of completed cartons is rapidly and effectively accomplished in substantially the same plane, in a straight-through, pull-type operation, with virtually no opportunity for jamming of the blanks or cartons within the machine.

While the invention has been illustrated and described in connection with a preferred embodiment thereof, it is capable of other variations and modifications within the scope of the claims appended hereto.

We claim:

1. In a carton folding machine: a feeding station including guide means forming a hopper and means to positively grasp a forward portion of a carton blank in lowermost position within the hopper to deflect the same below the plane of said guide means; feed conveyor means movable in response to an intermittent motion mechanism to pull one carton at a time from said hopper, said feed conveyor means including projections adapted to engage the forward portion of the carton blank in said downwardly deflected position; a carton folding station adapted to intermittently receive said cartons and to fold the same into a partitioned carton; and endless discharge conveyor means including a projection adapted to engage upthrust forward end portions of said folded cartons to positively pull one carton at a time from said folding station; whereby successive straight-through feeding of carton blanks and discharge of folded cartons is positively achieved with a minimum possibility of jamming of the machine.

2. A carton folding machine as in claim 1 wherein said hopper is composed of front upstanding guides and lower side support members providing an open hopper construction adapted to facilitate loading of blanks into the hopper.

3. A carton folding machine as in claim 2 wherein the minimum distance between the projections on said feed conveyor and the front guides and side support members of said hopper is substantially greater than the maximum thickness of a carton blank to thereby minimize jamming as the carton leaves the hopper.

4. A carton folding machine as in claim 1 wherein said means to positively grasp the lowermost carton in the hopper comprises pivotally mounted suction elements.

5. In a carton folding machine: a feeding station including guide means forming a hopper, and means to positively grasp the lowermost carton blank in the hopper to deflect the same below the plane of the hopper; feed conveyor means movable in response to an intermittent motion mechanism to pull one carton at a time from said hopper, said feed conveyor means including projections adapted to engage each carton blank in the downwardly deflected position; a carton folding station adapted to intermittently receive said cartons and to fold the same into a carton; said folding station including means to hold a lower portion of said carton blank and thereafter to fold upper portions of said blank to achieve a hollow-box carton form, means to bend a plurality of up-thrust partitions in said upper blank portions into a transverse attitude, slide means to positively grip said bent partitions, and means to fold and tuck up-thrust lower portions of the blank into interlocking engagement with said plurality of partitions to form a completed carton; and endless discharge conveyor means including lateral projections adapted to engage up thrust end portions of said folded cartons to positively pull one completed carton at a time from said folding station; whereby successive straight-through feeding of carton blanks and discharge of folded cartons is positively achieved with a minimum possibility of jamming of the machine.

6. A carton folding machine as in claim 5 wherein said means to hold the carton blank are frictionably engageable with said means to fold the blank into hollow box form, such frictional engagement permitting relative movement of the holding means to engage the blank prior to operation of the folding means.

7. A carton machine as in claim 5 wherein said means for bending a plurality of partitions from the blank includes right and left hand partition engaging components, said components being pivotally movable together to a first position, with one of the components being thereafter slidably movable to a second position spaced from the first, whereby a positive planar support of each of said plurality of partitions can be obtained during subsequent folding of lower portions of the blank into interlocked engagement.

8. A carton folding machine as in claim 7 wherein said right and left hand components are biased into said second position by releasable spring means.

References Cited in the file of this patent

UNITED STATES PATENTS

| 2,639,648 | Fahey | May 26, 1953 |
| 2,700,922 | Jordan | Feb. 1, 1955 |
| 2,828,126 | La Bombarde | Mar. 25, 1958 |